Oct. 31, 1961 H. G. McCARTY 3,006,135
SIDE DELIVERY HAY RAKE
Filed Nov. 17, 1959 2 Sheets-Sheet 1

INVENTOR
HORACE G. McCARTY
By Walter V. Wright, Agent

Oct. 31, 1961 — H. G. McCARTY — 3,006,135
SIDE DELIVERY HAY RAKE
Filed Nov. 17, 1959 — 2 Sheets-Sheet 2
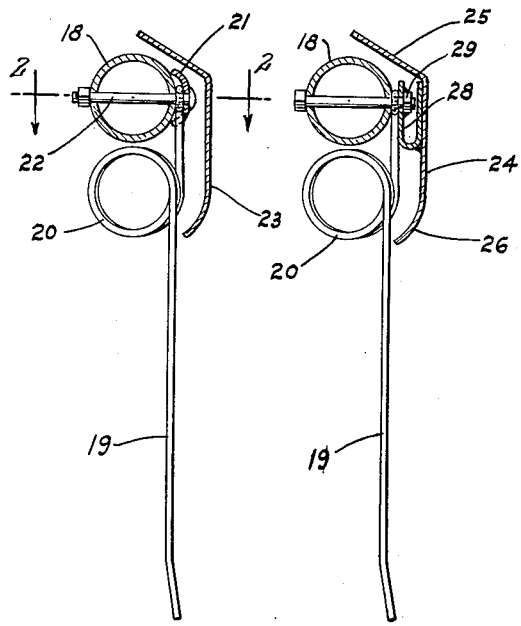
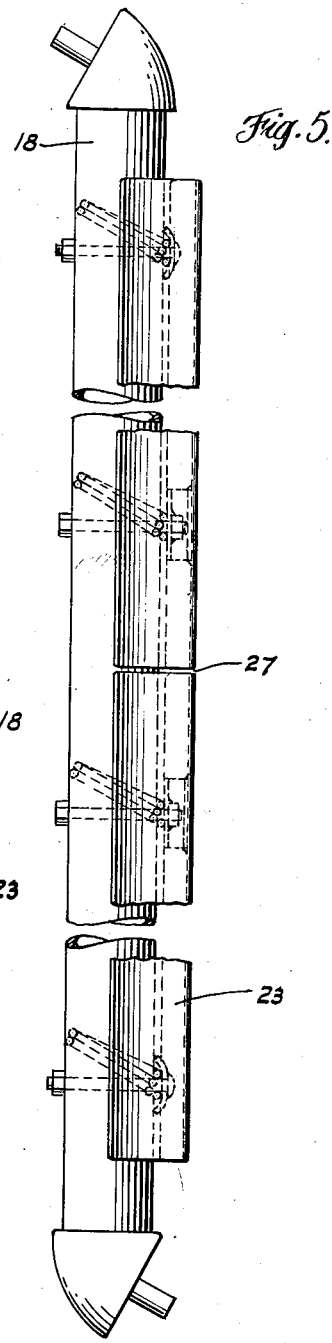
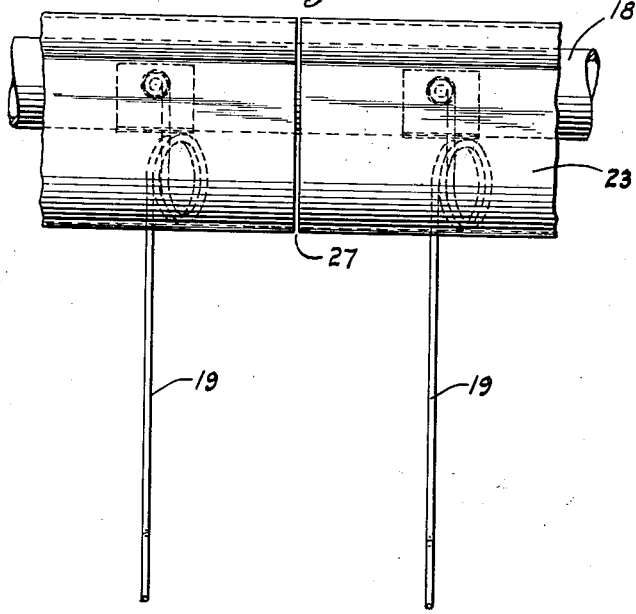
INVENTOR
HORACE G. McCARTY
By Walter V. Wright, Agent 3,006,135
SIDE DELIVERY HAY RAKE
Horace G. McCarty, New Holland, Pa., assignor to Sperry Rand Corporation, New Holland, Pa., a corporation of Delaware
Filed Nov. 17, 1959, Ser. No. 853,524
6 Claims. (Cl. 56—377)

This invention relates generally to side delivery hay rakes, and more particularly to a side delivery rake of the well-known roller bar reel type as exemplified in the U.S. Patent No. 2,781,626 issued February 19, 1957.

It is conventional, in reel type side delivery rakes having a plurality of roller bars with hay gathering tines mounted thereon, to provide a number of stationary stripper bars on the reel frame. In operation the tines move between the stripper bars to gather hay from the ground. As the tines move upwardly in beginning their return stroke, the stripper bars deflect the hay from the tines causing it to roll forwardly and laterally along the reel into a windrow. Clearance space must be provided between the tines for the stripper bars. The high operating speeds of today's rakes give rise to considerable centrifugal force which deflects the roller bars and the resilient tines. As a result of this deflection, the spacing between the tines and stripper bars must be reasonably large to prevent harmful clashing of tines on stripper bars. Applicant has found that very short thin hay, resulting from a dry season for example, may pass between the tines through the clearance space required for the stripper bars and be missed by the rake.

In accordance with the present invention the stripper bars are eliminated and their function provided by means not requiring special spacing between tines.

It is an object of this invention to provide a side delivery rake that will rake more evenly and miss less hay than prior rakes.

It is an object of this invention to provide moving deflecting plates that will function as stripper bars while allowing closer tine spacing.

It is a further object of this invention to provide a deflecting shield that will prevent hay from becoming entangled on the tine bar and the tine mounts and coils.

The foregoing objects and advantages are attained by the preferred embodiment of the invention illustrated in the accompanying drawings in which:

FIG. 3 is a cross section taken on the line 3—3 of FIG. 2;

FIG. 4 is a cross section taken on the line 4—4 of FIG. 2;

FIG. 5 is a plan view of a roller bar with applicant's shield mounted thereon; and FIG. 6 is a fragmentary elevational view of the central portion of a roller bar as seen looking toward the left in FIG. 5.

Figures 1, 2:
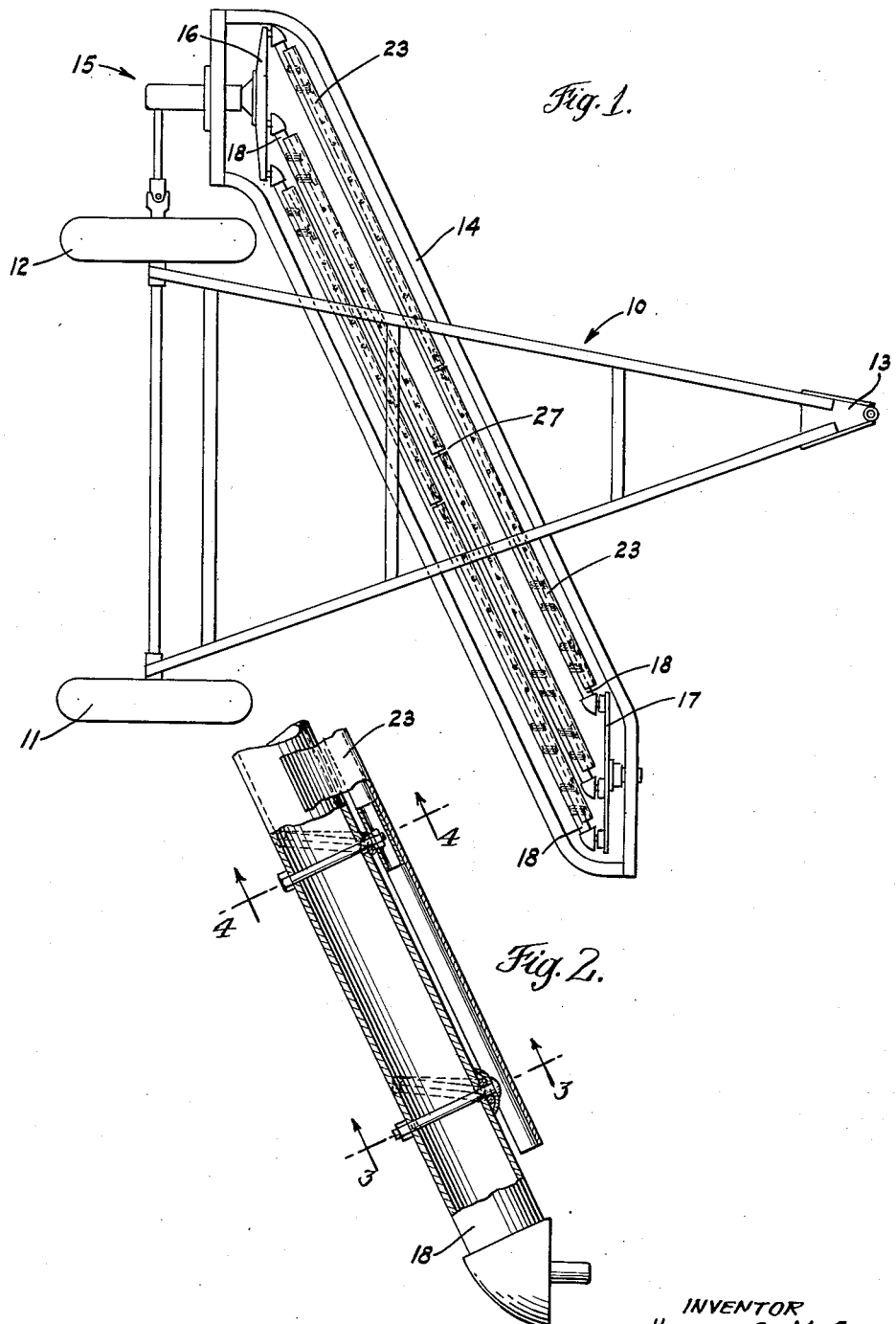
FIG. 1 is a diagrammatic plan view of a roller bar rake illustrating an application of the tine bar shields of the invention.
FIG. 2 is an enlarged fragmentary section taken on the line 2—2 of FIG. 3.

Referring now in detail to the drawings, the numeral 10 indicates, generally, a main frame having ground wheels 11 and 12 at the rear end thereof and a tractor hitch 13 at the front. A subframe or reel frame 14 is suspended beneath frame 10 and extends generally transverse relative thereto. Rotatably mounted at the respective ends of reel frame 14 are spiders 16 and 17. Spider 16 is connected by conventional means, indicated at 15, to be driven from ground wheels 11 and 12. A plurality of roller bars or tine mounting bars 18 have their respective ends rotatably mounted on spiders 16 and 17. At spaced points along the length of tine bars 18 are mounted hay gathering tines 19. Each tine 19 is formed with a coil spring portion 20, as seen in FIG. 3, to add to the resiliency of the tines. Each tine is formed with an eye at its upper end and is attached to the forward face of the tine bar by a clamp member 21 and a bolt 22 which passes through the clamp member, the eye and the tine bar 18. A nut is threaded onto the bolt at the rear of bar 18. See FIG. 3.

Mounted on the front of each tine bar 18 is a tine bar shield 23. As seen in FIG. 4, the shield has a first hay deflecting face 24 which is virtually perpendicular to the ground: a second face 25 which extends rearwardly and upwardly from face 24; and a curved third face 26 which extends downwardly and rearwardly from face 24 and terminates below coil portion 20 of tines 19. In the preferred embodiment, each shield is made up of two sections, each section covering approximately half the length of the tine bar. The small space between the sections is shown in FIGS. 1, 5 and 6 at 27. The shields are mounted on the face of bars 18 in front of the tine mounts in the following manner: Near each end of each shield section a spring clip 28 is provided. The clips are welded to the rear face of shield 23, as seen in FIG. 4. Each clip is U-shaped in cross section and has a bolt hole provided in one of the legs of the U. A nut 29 is welded to the inside face of the clip in alignment with the bolt hole. The spacing of the clips, on the shield sections, is such that the bolt holes of the clips will register with tine mounting bolt holes in bar 18. At the points where the shield is mounted, the tine clamp 21 is replaced by the spring clip 28 and the bolt is passed through bar 18 from the rear, through the tine eye and turned into the nut 29 that is welded to the spring clip.

Operation

The direction of rotation of spiders 16 and 17 is such that on a working stroke the tine bars move downwardly, then laterally, and then upwardly relative to the frame. During this stroke, the entire rake is moving to the right as viewed in FIG. 1. As the tines of a given bar move laterally, they gather the hay from the ground. As these tines move upwardly in completing their working stroke, hay may cling to them in the form of tails. These tails hang in the path of the shield plate of the following tine bar, which is then moving upwardly and laterally relative to the tails. The faces 24 and 25 of this following shield strike the hay, deflecting it away from the tines in a path upwardly and laterally relative to the frame. As a result of the angle at which the reel frame is mounted, relative to the path of movement of the device, the shield striking the hay also tends to move the hay in a direction forwardly of the rake. As this shield rises, face 24 will continue to push the hay forwardly and laterally. As the bar completes its working stroke, face 26 completes the forward and lateral rolling of the hay. The speed at which the tine bars travel is such that all the faces of a shield are working substantially simultaneously and one shield has begun its operation before the preceding shield is retracted. Consequently, a continuous flow of hay is kept rolling upwardly and forwardly of the reel. The extent of the relatively smooth forward faces of shields 23 is such that hay is prevented from contacting and snagging on the tine bar, the tine mounts or the tine coils; hence, it is easily deflected away from the tines by the rapidly moving shields.

As mentioned before, the tine bar is continually deflected by centrifugal force resulting from the rapid movement of the bar in a curved path. The break at 27, see FIGS. 5 and 6, between the shield sections permits the bar to deflect without bringing about fatigue failure of the shield at this point.

This method of deflecting hay from the tines eliminates the need for stripper bars. As high as fifty percent more tines may be mounted on a given bar merely by adding tines in the spaces previously required for stripper bars. Hay that previously passed through the stripper bar spaces and was skipped is picked up by the tines filling those spaces.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A side delivery reel type rake comprising a frame adapted for movement forwardly over the ground, a pair of spiders mounted on said frame for rotation respectively about spaced parallel axes extending generally in the direction of ground travel, a plurality of tine bars suspended between said spiders and having ends rotatably mounted thereon, one of said spiders being disposed laterally and rearwardly of the other whereby upon rotation of said spiders said tine bars successively move downwardly, laterally and then upwardly relative to the direction of ground travel on working strokes, a plurality of hay gathering tines spaced along each bar, the tines on a given bar depending therefrom in a generally vertical plane during the entire working stroke of the bar, a hay deflecting shield carried by each tine bar and disposed forwardly thereof, each shield having a plurality of hay deflecting faces, one of the faces of each shield lying in a plane inclined upwardly and rearwardly relative to the plane of the tines of the preceding bar on a working stroke whereby as a given tine bar completes its working stroke said one face of a shield carried thereby moves upwardly into the hay gathered by the tines of the preceding bar and deflects said hay forwardly and laterally away from the tines of said preceding bar.

2. A side delivery rake as recited in claim 1 wherein said tine bars are supported solely by the mounting of their ends in said pair of spiders whereby the medial portion of each bar bows outwardly upon rotation of said spiders, and wherein a pair of hay deflecting shields are carried by each bar, each shield extending from adjacent one of said spiders to a point approximately midway between the ends of the tine bar on which it is carried thus preventing fatigue failure of said shields as a result of repeated bowing of the medial portion of the tine bars.

3. A side delivery rake as recited in claim 1 wherein another of said plurality of hay deflecting faces of each shield extends vertically downwardly from the lower edge of said one face and coacts therewith to further the forward and lateral deflecting movement imparted to the hay by said one face.

4. A side delivery rake as recited in claim 3 wherein each of said tines includes a coil spring portion disposed below the tine bar upon which it is mounted and each of said shields includes a third deflecting face extending generally downwardly and rearwardly from the lower edge of said vertically extending face and terminating below the coil spring portion of the immediately adjacent tines.

5. A side delivery rake as recited in claim 4 wherein each shield is mounted on its tine bar by means carried on the rearwardly facing side of the shield thereby providing smooth continuous hay engaging forward faces on each shield.

6. A side delivery reel type rake comprising a frame adapted for movement forwardly over the ground, a pair of spiders mounted on said frame for rotation respectively about spaced parallel axes extending generally in the direction of ground travel, a plurality of tine bars suspended between said spiders and having ends rotatably mounted therein, one of said spiders being disposed laterally and rearwardly of the other whereby upon rotation of said spiders said tine bars successively move downwardly, laterally and then upwardly relative to the direction of ground travel on working strokes, a plurality of hay gathering tines spaced along each bar, each tine having a coil spring portion, means mounting said tines on said bars with the coil spring portion of each tine disposed below the tine bar upon which it is mounted, a pair of shield plates mounted along the leading edge of each tine bar for deflecting hay forwardly and laterally relative to the direction of ground travel, each shield plate extending from adjacent one of said spiders to a point substantially midway between the ends of the tine bar upon which it is mounted, each of said plates having an uninterrupted planar first hay deflecting face disposed in a substantially vertical plane, a second hay deflecting face extending upwardly and rearwardly from said first face and a third deflecting face extending generally downwardly and rearwardly from said first face and terminating below the coil spring portion of said tines whereby as a given tine bar moves upwardly and rearwardly upon completing its working stroke and hay gathered by the tines thereon begins to drop therefrom, the shield plate carried by the following tine bar moves upwardly and laterally into said hay and the upwardly and rearwardly inclined face of said following shield plate drives said hay upwardly, forwardly and laterally away from the tines of said given tine bars, the vertical and downwardly and rearwardly inclined faces of said following shield plate successively engaging said hay and deflecting it forwardly and laterally relative to the direction of ground travel of said rake.

References Cited in the file of this patent

UNITED STATES PATENTS

| | | |
|---|---|---|
| 471,648 | Mann | Mar. 29, 1892 |
| 481,501 | Mann | Aug. 23, 1892 |
| 2,729,931 | Hamilton | Jan. 10, 1956 |
| 2,750,729 | Skromme et al. | June 19, 1956 |